United States Patent [19]

Makedonski et al.

[11] 4,451,269

[45] May 29, 1984

[54] POLISHING COMPOSITION FOR CENTRIFUGAL MAGNETIC-ABRASIVE MACHINES

[75] Inventors: Boris G. Makedonski; Haralampi A. Atanassov, both of Sofia, Bulgaria

[73] Assignee: Centralen Mashinostroitelen Institute, Sofia, Bulgaria

[21] Appl. No.: 458,897

[22] Filed: Jan. 18, 1983

[30] Foreign Application Priority Data

Jan. 18, 1982 [BG] Bulgaria ............................ 55024

[51] Int. Cl.$^3$ ............................................. C09K 3/14
[52] U.S. Cl. ........................................ 51/303; 51/304; 51/309
[58] Field of Search ........................... 51/303, 304, 309

[56] References Cited

U.S. PATENT DOCUMENTS

| | | | |
|---|---|---|---|
| 2,119,159 | 5/1938 | Glenning | 51/304 |
| 2,622,047 | 12/1952 | Ayers | 51/303 |
| 3,695,934 | 10/1972 | Feldhaus | 51/304 |

*Primary Examiner*—James H. Derrington

[57] ABSTRACT

The polishing composition for a centrifugal magnetic-abrasive machine for machining complex profiled workpieces. The composition exhibits ferro-magnetic properties and could be used in all centrifugal and magnetic-abrasive machines but more particularly in the combined centrifugal magnetic-abrasive machines wherein high roughness grades of the machined surfaces are obtained from comparatively low speeds of centrifugal packing and low magnetic field intensity. The composition is made of a 84–86% mixture of abrasive grains and iron-powder; 4–6% of a mixture of chromium sesquioxide, stearine, and oleic acid; 4–6% ground fruit pits or sawdust; and 4–6% of a 3% aqueous solution of triethanolamine soap. In their respective mixtures the abrasive grains are 5–40 mm in size and amount to 16–20%, the iron-powder amounts to 80–84%, the chromium sesquioxide of the 1–10 mm grain size amounts to 55–57%, the stearine amounts to 37–39%, and the oleic acid amounts to 5–7%.

6 Claims, No Drawings

POLISHING COMPOSITION FOR CENTRIFUGAL MAGNETIC-ABRASIVE MACHINES

BACKGROUND OF THE INVENTION

This invention relates to polishing compositions but more particularly to a polishing composition for centrifugal magnetic-abrasive machines intended for the machining of complex profiled work pieces therefore predominantly made of non-ferrous metals and alloys.

There are known in the art polishing compositions for magnetic-abrasive machining made up of cermet powders and additionally introduced coolants. The most frequently used cermet powders are those that are mixtures of iron powder and abrasives, which are prepared following a special technology. In using these cermets for magnetic-abrasive polishing with a suitable coolant, high roughness grades of the machined surfaces can be obtained for a relatively short machining time.

A disadvantage of the cermet mixtures known is their inapplicability for use in combined magnetic-abrasive and centrifugal machines. This is predominantly due to the fact that the cermets become extremely densely packed in the centrifugal barrel making it impossible for the workpiece to be immersed in the work area. This packing effect is rendered particularly high by the presence of a strong magnetic field.

There are known polishing compositions for centrifugal abrasive machines that must often include a light carrier and an abrasive ingredient. For light carriers, use is made of sawdust, plastic beads, expanded polystyrene balls, etc. Compositions of these types are relatively good in polishing various workpieces made of ferrous and non-ferrous metals and alloys. These known composition also have the same basic disadvantage, that is, their inapplicability for use in combined magnetic-abrasive and centrifugal machines. This is due to the fact that they lack a ferro-magnetic constituent hence they can not be packed, oriented and autoalligned to the machined surfaces and therefore can not self-cover the traces left by the workpieces in the abrasive medium. This disadvantage imposes the necessity for complex kinematic movements for the process of centrifugal abrasive machining.

SUMMARY OF THE INVENTION

It is an object of the present invention to provide a polishing composition for centrifugal magnetic-abrasive machines for polishing complex profiled work pieces made predominantly of non-ferrous metals and alloys, that is fit for application in combined magnetic-abrasive and centrifugal machines and also would yield a result of high roughness grades for the surface machined at comparatively low speeds of centrifugal packing and low magnetic field intensity.

It is another object of the present invention to provide a polishing composition for centrifugal magnetic abrasive machines for polishing complex profiled workpieces made up from a mixture of abrasive grains, and iron powder; a mixture of chromium sesquioxide, stearine, and oleic acid; ground fruit pits or sawdust; and a 3% aqueous solution of triethanolamine soap.

It is yet another object of the present invention to provide a polishing composition for centrifugal magnetic-abrasive machines wherein the mixture of abrasive grains and iron powder is in the range of 84-86%; the mixture of chromium sesquioxide, stearine, and oleic acid is in the range of 4-6%; fruit pits are of sawdust is in the range of 4-6%; and the 3% aqueous solution of triethanolamine soap is in the range of 4-6%.

It is yet still another object of the present invention to provide a polishing composition for centrifugal magnetic-abrasive machines wherein the abrasive grains are in the range of 16-20%; the iron powder is in the range of 84-80%; the chromium sesquioxide is in the range of 55-57%; the stearine is in the range of 37-39%; and the oleic acid is in the range of 5-7%.

It is still a further object of the present invention to provide a polishing composition for centrifugal magnetic-abrasive machines wherein the size of the abrasive grains are in the range of 5-40 mm; and the size of the grain of chromium sesquioxide is in the range of 1-10 mm.

The polishing compound of the present invention exhibits ferro-magnetic properties and could be used in all centrifugal and magnetic-abrasive machines but more particularly in the combined centrifugal magnetic-abrasive machines wherein high roughness grades of the machined surfaces are obtained at comparatively low speeds of centrifugal packing and low magnetic field intensity.

EXAMPLES

For a better understanding of the invention reference will be made by way of an example of a polishing composition consisting of four ingredients:

Ingredient No. 1—cermet mixture—amounting to approximately 85% of the total is prepared of 16% abrasive grains of 5-40 mm size (the exact size of the abrasive grains depend on the hardness value of the material to be machined high hardness values—large sizes and vice versa), and 84% iron powder. The production cycle for the cermet mixture includes the processes of mixing, pressing, caking, grinding, and milling.

Ingredient No. 2—polishing composition—amounting to 5% of the total and contains 56% chromium sesquioxide with up to 10 mm grain sizes, 38% stearine, and 6% oleic acid.

Ingredient No. 3—filler—amounting to approximately 5% of the total and representing milled fruit pits, sawdust, or others of the kind.

Ingredient No. 4—a 3% aqueous solution of triethanolamine soap—amounting to 5% of the total.

The polishing composition is prepared in the following sequence:

the cermet mixture is made following the familiar technology and is then introduced into stearine and chromium hemitrioxide while heating at 60-80%C. The mixture is well agitated and homogenized. After it is cooled the filler is introduced thereto, and after being loaded in the machine the wetting agent is introduced.

We claim:

1. A polishing composition for centrifugal magnetic-abrasive machines intended for machining complexed profiled workpieces, comprising: a mixture of abrasive grains and iron powder; a mixture of chromium sesquioxide, stearine, and oleic acid; ground fruit pits or sawdust; and a 3% aqueous solution of triethanolamine soap.

2. A polishing composition for centrifugal magnetic-abrasive machines intended for machining complexed profiled workpieces as in claim 1, wherein the amount of said mixture of abrasive grains and iron powder is in the range of 84-86%; the amount of said mixture of chromium sesquioxide, stearine, and oleic acid is in the range of 4-6%; the amount of said ground fruit pits are or sawdust is in the range of 4-6%; and the amount of said 3% aqueous solution of triethanolamine soap is in the range of 4-6%.

3. A polishing composition for centrifugal magnetic-abrasive machines intended for machining complexed profiled workpiece as in claim 2, wherein the mixture of abrasive grains and iron powder consists of 16-20% of abrasive grains and 84-80% of iron powder.

4. A polishing composition for centrifugal magnetic-abrasive machines intended for machining complexed profiled workpieces as in claim 3, wherein the size of the abrasive grains are in the range of 5-40 mm.

5. A polishing composition for centrifugal magnetic-abrasive machines intended for machining complex profiled workpieces as in claim 4, wherein the mixture of chromium sesquioxide, stearine, and oleic acid consist of 55-75% of chromium sesquioxide, 37-39% stearine, and 5-7% oleic acid.

6. A polishing composition for centrifugal magnetic-abrasive machines intended for machining complex profiled workpieces as in claim 4, wherein the size of the chromium sesquioxide is in a range of 1-10 mm.

* * * * *